(12) United States Patent
Matsui et al.

(10) Patent No.: US 12,467,805 B2
(45) Date of Patent: Nov. 11, 2025

(54) APPARATUS AND METHODS FOR CALCULATING THE BEHAVIOR OF LINEAR STRUCTURES

(71) Applicants: NTT, Inc., Tokyo (JP); THE UNIVERSITY OF TOKYO, Tokyo (JP)

(72) Inventors: Takashi Matsui, Musashino (JP); Kazuhide Nakajima, Musashino (JP); Nobutomo Hanzawa, Musashino (JP); Ryota Wada, Tokyo (JP); Hideaki Murayama, Tokyo (JP)

(73) Assignee: NTT, Inc., Tokyo (JP)

( * ) Notice: Subject to any disclaimer, the term of this patent is extended or adjusted under 35 U.S.C. 154(b) by 248 days.

(21) Appl. No.: 18/034,899

(22) PCT Filed: Oct. 18, 2021

(86) PCT No.: PCT/JP2021/038481
§ 371 (c)(1),
(2) Date: May 2, 2023

(87) PCT Pub. No.: WO2022/097466
PCT Pub. Date: May 12, 2022

(65) Prior Publication Data
US 2024/0019323 A1  Jan. 18, 2024

(30) Foreign Application Priority Data
Nov. 5, 2020 (JP) ................. 2020-185198

(51) Int. Cl.
*G01L 1/24* (2006.01)
*G01B 11/24* (2006.01)

(52) U.S. Cl.
CPC .............. *G01L 1/242* (2013.01); *G01B 11/24* (2013.01)

(58) Field of Classification Search
CPC ......... G01L 1/242; G01L 1/243; G01L 1/245; G01L 1/246
See application file for complete search history.

(56) References Cited

U.S. PATENT DOCUMENTS

| 9,256,830 B2 * | 2/2016 | Kearns | .............. H01Q 3/34 |
| 2011/0109898 A1 * | 5/2011 | Froggatt | ............. G01L 1/242 |
| | | | 356/73.1 |
| 2016/0349044 A1 * | 12/2016 | Marell | ............. G01B 21/045 |

FOREIGN PATENT DOCUMENTS

| EP | 2860489 A2 * | 4/2015 | ......... B63B 21/00 |
| JP | 2006145388 A * | 6/2006 | |
| JP | 2013-505441 A | 2/2013 | |

OTHER PUBLICATIONS

J. V. Grindheim, I. Revahug, and E. Pedersen, "Utilizing the ensemble kalman filter and ensemble kalman smoother for combined state and parameter estimation of a three dimensional towed underwater cable model", Journal of Offshore Mechanics and Arctic Engineering, vol. 139, No. 6, p. 061303, 2017.

(Continued)

*Primary Examiner* — Herbert K Roberts

(57) ABSTRACT

An object of the present disclosure is to enable behavior of a linear structure in water to be estimated. The present disclosure is an apparatus that: expresses at least one parameter in a plurality of discrete values, and forecasts behavior of a linear structure by using each of the discrete values; acquires behavior of the linear structure detected using an optical fiber; calculates a likelihood between the forecasted behavior of the linear structure and the acquired behavior of the linear structure; updates at least one of the plurality of discrete values on the basis of the likelihood; and calculates behavior of the linear structure by using the updated plurality of discrete values.

6 Claims, 7 Drawing Sheets

(A) DEFLECTION ANGLE USING ACTUAL MEASUREMENT (B) ESTIMATED DEFLECTION ANGLE

(56) References Cited

OTHER PUBLICATIONS

Kazuyuki Nakamura, "Using data assimilation to develop understanding, measurement and modeling of uncertain phenomena", RIMS Kokyuroku. 2017, vol. 2057, pp. 59-66 with machine generated English translation thereof.

Tomoyuki Higuchi et al., "Analysis: Special feature. Measurements and sensing algorithms. Using data assimilation to speed up online sensing", Journal of the Society of Instrument and Control Engineers. 2012, vol. 51, No. 9, pp. 800-807 with machine generated English translation thereof.

* cited by examiner

[7]

APPARATUS AND METHODS FOR CALCULATING THE BEHAVIOR OF LINEAR STRUCTURES

CROSS-REFERENCE TO RELATED APPLICATIONS

This application is a 371 U.S. National Phase of International Application No. PCT/JP2021/038481, filed on Oct. 18, 2021, which claims priority to Japanese Patent Application No. 2020-185198, filed Nov. 5, 2020. The entire disclosures of the above applications are incorporated herein by reference.

TECHNICAL FIELD

The present disclosure relates to an apparatus and methods for estimating the behavior of a linear structure in water, such as a submarine cable, by means of reflectometry technology using an optical fiber.

BACKGROUND ART

A method for detecting the behavior of a linear structure in water, such as a submarine cable, by using an optical fiber sensor has been proposed. An optical fiber sensor is technology for measuring and analyzing a reflection spectrum of an optical fiber by using OFDR (Optical Frequency Domain Reflectometry) to derive a three-dimensional shape of a measured target. Fiber optic sensors are capable of dynamic measurements over long distances. However, in the monitoring of a linear structure in water, there is the problem of an accumulation of errors due to integral calculations along the optical fiber.

In addition, as a method suitable for estimating a phenomenon in real time, there exists the example of behavior estimation using sequential data assimilation in which data assimilation is performed for each obtainment of time observation data (see, for example, Non Patent Literature 1). However, this method employs, as observation data, discrete position information of a linear structure acquired by a global positioning system (GPS) or the like. In order to acquire the position information, it is necessary to receive radio waves in water. Therefore, as the depth in water increases, acquiring the position information becomes problematic and obtaining continuous data in the length direction becomes difficult.

CITATION LIST

Non Patent Literature

Non Patent Literature 1: J. V. Grindheim, I. Revahug, and E. Pedersen, "Utilizing the ensemble kalman filter and ensemble kalman smoother for combined state and parameter estimation of a three dimensional towed underwater cable model", Journal of Offshore Mechanics and Arctic Engineering, Vol. 139, No. 6, p. 061303, 2017.

SUMMARY OF INVENTION

Technical Problem

An object of the present disclosure is to enable the behavior of a linear structure in water to be estimated.

Solution to Problem

An apparatus and a method according to the present disclosure include:

expressing at least one parameter in a plurality of discrete values, and forecasting behavior of a linear structure by using each of the discrete values;
acquiring behavior of the linear structure detected using an optical fiber;
calculating a likelihood between the forecasted behavior of the linear structure and the acquired behavior of the linear structure;
updating at least one of the plurality of discrete values on the basis of the likelihood; and
calculating behavior of the linear structure by using the updated plurality of discrete values.

Advantageous Effects of Invention

The present disclosure enables the behavior of a linear structure in water to be estimated.

DESCRIPTION OF EMBODIMENTS

Hereinafter, embodiments of the present disclosure will be described in detail with reference to the drawings. Note that the present disclosure is not limited to the following embodiments. These examples are merely examples, and the present disclosure can be carried out in a variety of forms obtained through modifications and improvements based on the knowledge of those skilled in the art. Note that components having the same reference signs in the present specification and the drawings indicate the same components.

First Embodiment

Figure 1:
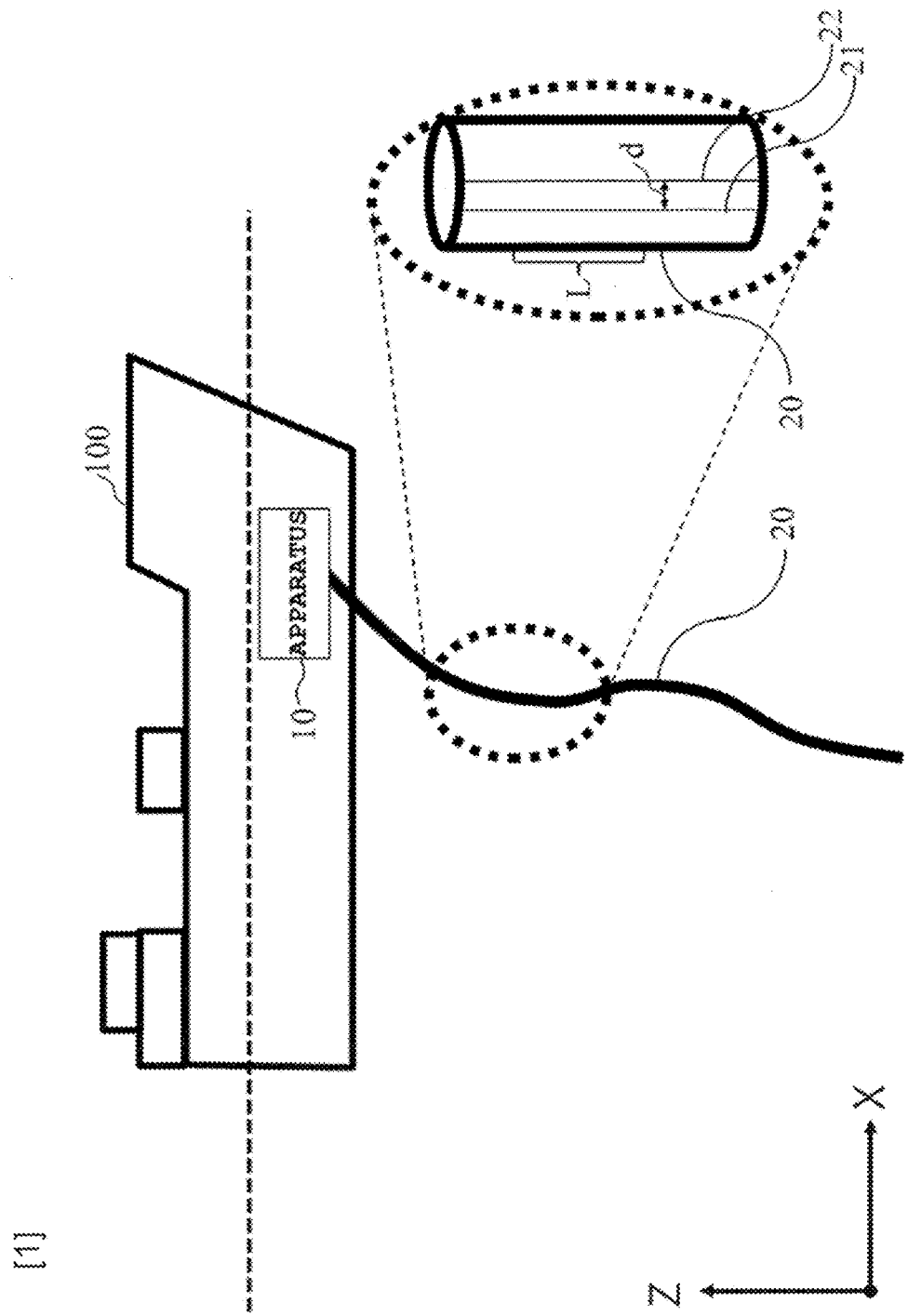
FIG. 1 illustrates an example of a system configuration of the present disclosure.

FIG. 1 illustrates an example of a system configuration according to the present embodiment. In the system according to the present embodiment, an apparatus 10 is mounted on a ship 100, and the apparatus 10 is connected to a linear structure 20. The apparatus 10 according to the present embodiment is an apparatus that calculates behavior of the linear structure of the present disclosure, and estimates behavior of the linear structure 20, which is present in water, using parameter estimation based on data assimilation which is grounded on a distribution-type optical fiber sensor and Bayesian inference.

Behavior of the linear structure 20 is, for example, three-dimensional coordinates of the linear structure 20. The three-dimensional coordinates of the linear structure 20 can be calculated using the displacement in the rotation direction of the linear structure 20 with respect to the position of at least one point of the linear structure 20 from which the position information can be acquired. Therefore, in the present embodiment, an example in which the behavior of the linear structure 20 is displacement in the rotation direction for each length L of the linear structure 20 is described.

Figure 2:
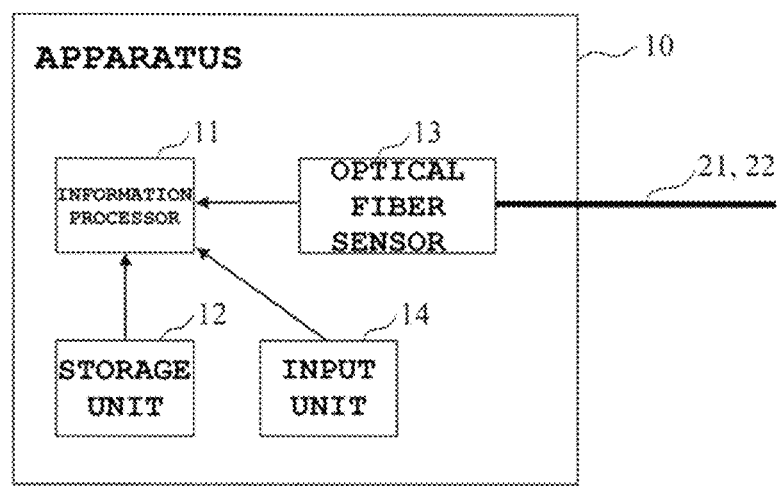
FIG. 2 illustrates an example of a hardware configuration of the apparatus of the present disclosure.

FIG. 2 illustrates an example of a hardware configuration of the apparatus 10. The apparatus 10 of the present embodiment includes an information processor 11, a storage unit 12, an optical fiber sensor 13, and an input unit 14. The input unit 14 is any means that enables parameters to be inputted, such as a keyboard or a touch panel. The optical fiber sensor 13 is connected to optical fibers 21 and 22 that are arranged along the linear structure 20.

The optical fiber sensor 13 detects values of strain $\varepsilon_1$ and $\varepsilon_2$ in the two optical fibers 21 and 22. An optical fiber sensor using a BOTDR (Brillouin Optical Time Domain Reflectometer) is an example of means for detecting values of strain in the optical fibers 21 and 22, for example. In the following description, a case where the optical fiber sensor 13 is a BOTDR is assumed.

The information processor 11 calculates behavior of the linear structure 20 by using the strain detected by the optical fiber sensor 13. The displacement of the linear structure 20 in the rotation direction can be obtained using the length L of the linear structure 20 and a deflection angle $\theta$[rad] with respect to the length L of the linear structure 20. Therefore, the information processor 11 calculates the deflection angle $\theta$[rad] with respect to each length L of the linear structure 20 by using the values of the strain $\varepsilon_1$ and $\varepsilon_2$ of the linear structure 20. Hereinafter, an example in which the information processor 11 calculates the deflection angle $\theta$[rad] with respect to each length L of the linear structure 20 as the behavior of the linear structure 20 is described.

Furthermore, the information processor 11 forecasts behavior of the linear structure 20 by using a simulator. For example, the information processor 11 uses freely selected parameters to simulate the behavior of the linear structure 20 and calculates the state quantity U(t). The information processor 11 uses a state quantity U(t) to calculate displacement in the rotation direction with respect to each length L of the linear structure 20.

In addition to the values of the strain $\varepsilon_1$ and $\varepsilon_2$ detected by the optical fiber sensor 13, the storage unit 12 stores any data used for the processing by the information processor 11 and stores the processing result of the information processor 11. The data used for the processing by the information processor 11 includes a simulation program for forecasting the behavior of the linear structure 20 and parameters used by the simulation program. The apparatus 10 according to the present embodiment can also be realized by a computer and a program, and the program can be recorded on a recording medium or provided over a network. Details will be described hereinbelow.

Figure 3:
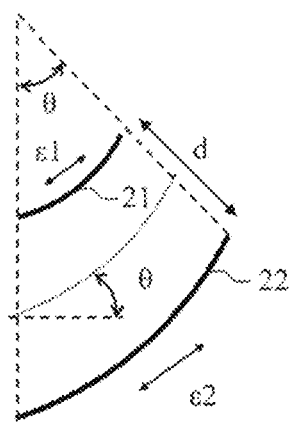
FIG. 3 illustrates an example of a modified image of two cores.

The two optical fibers 21 and 22 are placed along the linear structure 20 in water, and as illustrated in FIG. 3, the cores of the optical fibers 21 and 22 are deformed in accordance with the shape of the linear structure 20, and the values of the strain $\varepsilon_1$ and $\varepsilon_2$ are observed by the optical fiber sensor 13. The deflection angle $\theta$[rad], obtained by integrating the curvature of the linear structure 20 in water over a length L[m], is represented by Formula (1) including the distance d[m] between the cores of the optical fibers 21 and 22.

[Formula 1]

$$\theta = \frac{L}{d}(\varepsilon_2 - \varepsilon_1) \quad (1)$$

Figure 4:
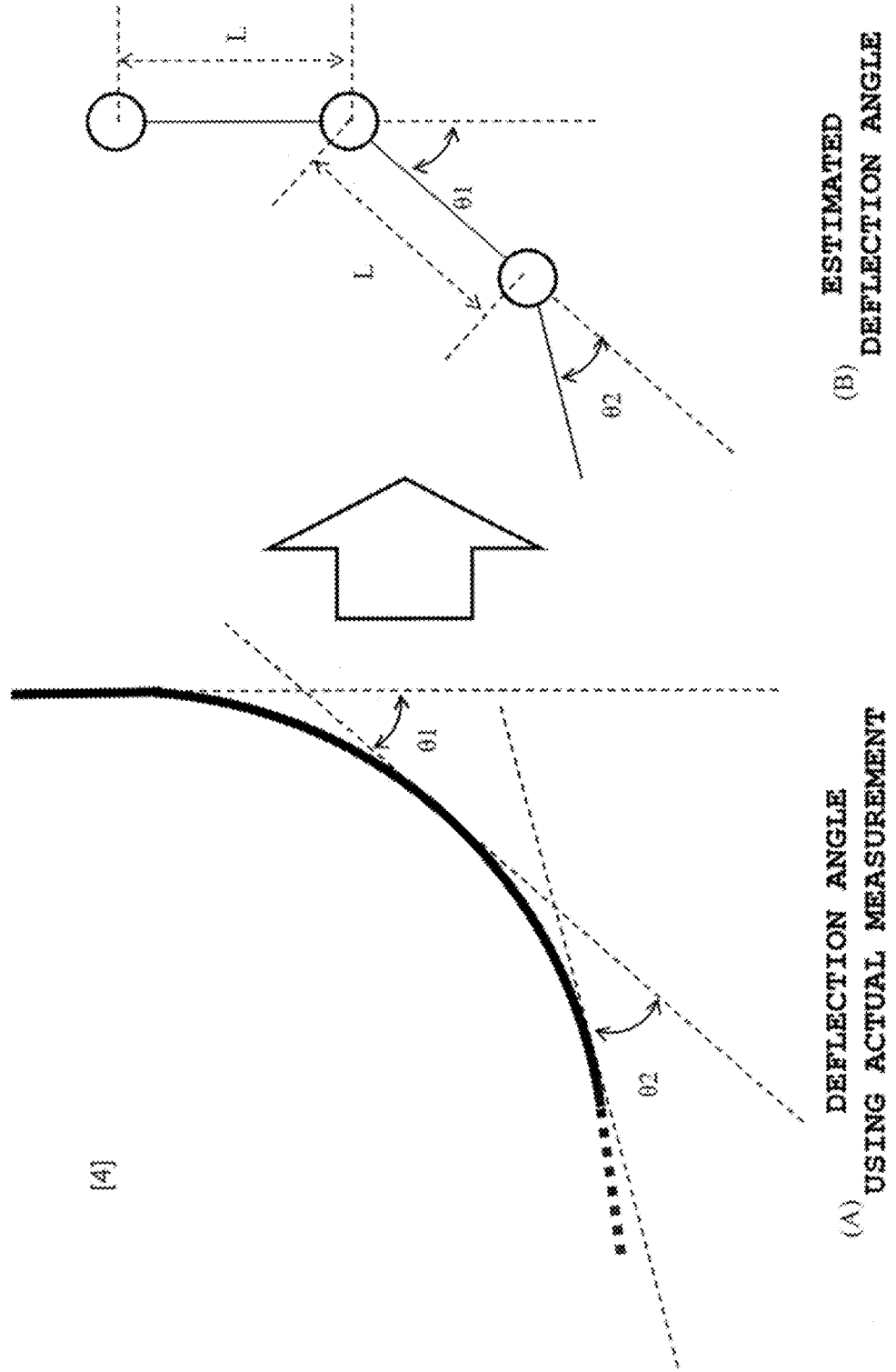
FIG. 4 illustrates an example of displacement in a rotation direction.

When the length L is the unit length for forecasting the behavior of the linear structure 20, the deflection angle $\theta$ in Formula (1) corresponds to the displacement in the rotation direction, which is obtained as a simulation forecasted value. For example, as illustrated in FIG. 4, deflection angles $\theta_1$ and $\theta_2$ using actual measurement correspond to deflection angles $\theta_1$ and $\theta_2$ using simulation forecasted values.

Given that the observation data of a strain distribution detected by the optical fiber sensor 13 is converted into deflection angle data y(t) for each length L, Formula (2) is derived.

[Formula 2]

$$y(t) = HU(t) + w(t) \quad (2)$$

Here, H is an observation matrix for extracting the displacement of the linear structure 20 in the rotation direction from the state quantity U(t) obtained by simulation. w(t) is an observation error. The observation error w(t) can be handled by assuming that same follows any probability distribution.

The observation matrix H is represented by the following formula.

[Formula 3]

$$H = \begin{bmatrix} h & 0 & 0 & \ldots & \ldots & \ldots & \ldots & 0 \\ 0 & h & 0 & \ldots & \ldots & \ldots & \ldots & 0 \\ \ldots & \ldots & \ldots & \ldots & \ldots & \ldots & \ldots & \ldots \\ 0 & 0 & 0 & \ldots & h & \ldots & \ldots & 0 \end{bmatrix} \quad (3)$$

$$h = [0 \ 0 \ 1]$$

When the deflection angle $\theta$ of the linear structure 20 is calculated, the observation matrix H is a matrix (N+1)×9 (N+1). In the present embodiment, an example is illustrated in which the observation data is the deflection angle data y, and a simulation forecasted value u extracted from the state quantity U is the displacement in the rotation direction, but changes can be made as appropriate, according to the combination of the observation data and the simulation forecasted values.

In the sequential data assimilation method, a merging particle filter is used, and a plurality of particles are replicated according to the likelihood together with observation data, and the ensemble, which is a set of particles, is updated by taking the weighted sum. The absolute likelihood of each particle is the infinite product of the observation data likelihood for each element, and for the relative likelihood of each element, a normal distribution, defined by the average value of the displacement in the rotation direction and the standard deviation of the observation error, is assumed and derived as a probability density function of the normal distribution.

Formulae (4) and (5) are used to calculate the absolute likelihood and the relative likelihood, respectively.

[Formula 4]

$$\lambda^{(i)}(t) = \prod_n P_n^{(i)}(t) = \prod_n \frac{1}{\sqrt{2\pi\{w_n(t)\}^2}} \exp\left[\left(-\frac{y_n(t) - u_n^{(i)}(t|t-\Delta t)\}^2}{2\{w_n(t)\}^2}\right)\right] \quad (4)$$

[Formula 5]

$$\gamma^{(i)}(t) = \frac{\lambda^{(i)}(t)}{\sum_i \lambda^{(i)}(t)} \quad (5)$$

Here, $\lambda^{(i)}(t)$ and $\gamma^{(i)}(t)$ represent the absolute likelihood and the relative likelihood of the i-th particle, respectively; $P_n^{(i)}(t)$ represents the likelihood of the n-th element in the i-th particle, $u_n^{(i)}(t|t-\Delta t)$ represents the displacement in the rotation direction of the n-th element in the i-th particle; $y_n(t)$ represents the deflection angle of the observation data of the corresponding portion; and $W_n(t)$ represents the observation error of the corresponding portion.

Figure 5:
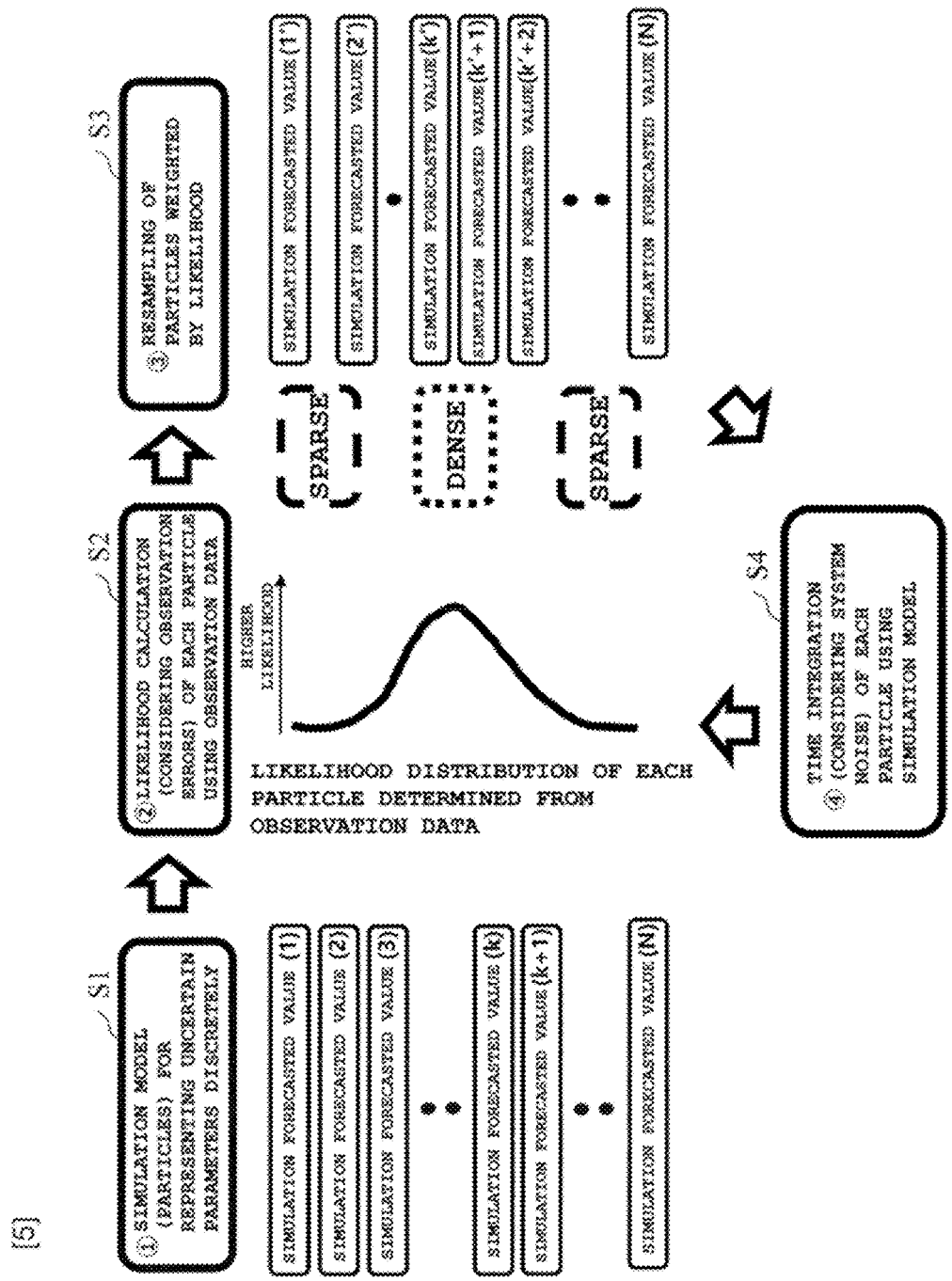
FIG. 5 illustrates an example of a flow describing the method of the present disclosure.

FIG. 5 illustrates an example of a processing flow of the information processor 11. The processing flow of the information processor 11 includes steps S1 to S4. The information processor 11 executes step S1, and upon acquiring the observation data, executes steps S2 to S4. In steps S2 to S4, the information processor 11 executes behavior estimation using the sequential data assimilation method.

Step S1: The uncertain parameters in the simulation model are represented by a plurality of discrete values, and the behavior of the linear structure 20 is forecasted using each of the discrete values. As a result, a plurality of simulation forecasted values are generated. In the present disclosure, a simulation forecasted value is referred to as a particle.

Step S2: Upon acquiring the observation data, the likelihood of each particle is calculated using the acquired observation data. At this time, an observation error may be considered as indicated in Formula (4).

Step S3: At least one of the plurality of discrete values is updated on the basis of the likelihood, and resampling of particles weighted by likelihood is performed.

Step S4: Time integration of each particle is performed using the simulation model. At this time, system noise may be considered.

Hereinafter, each step will be described in detail.

Step S1: In considering dynamic simulation of the linear structure 20, an assumed range of an uncertain parameter (for example, the deflection angle θ) is represented by discrete values $(\theta_1, \theta_2, \ldots, \theta_N)$, and a simulation forecasted value is obtained for each case (referred to as a particle). The discrete values within the assumed range are inputted from the input unit 14, for example. The simulation is performed, for example, by applying each parameter $(\theta_1, \theta_2, \ldots, \theta_N)$ to a model in which a linear structure, made of elastic rubber (Young's modulus: $5.0 \times 10^5$ Pa) having a length of 40 m, a diameter of 0.5 m, and a density of 1000 kg/m³, is hung straight in still water, and the upper end of the linear structure is subjected to single vibration in the horizontal direction with an amplitude of 2 m and a period of about 1.5 s for 10 seconds. As a result, the state quantity U(t) when each parameter is used is obtained, and the displacement in the horizontal direction with respect to each length L is determined.

Once the optical fiber sensor 13 detects the values of the strain $\varepsilon_1$ and $\varepsilon_2$ and the information processor 11 calculates the deflection angle θ to obtain the observation data for each length L, steps S2 to S4 are sequentially repeated.

Step S2: The information processor 11 compares the obtained observation data with an assumed observation error and each simulation forecasted value, and thus obtains the likelihood of each particle. For example, the absolute likelihood and the relative likelihood for each length L are obtained using Formulae (3) and (4).

Step S3: Particle resampling is performed using the relative likelihood obtained in step S2 as a weight. For example, when the relative likelihoods of the particles k', k'+1, and k'+2 are high and the relative likelihoods of the other particles are low, the discrete values in the parameter ranges used by the particles k', k'+1, and k'+2 are increased, the discrete values in parameter ranges other than those of the particles k', k'+1, and k'+2 are decreased, and the discrete values $(\theta_1, \theta_2, \ldots, \theta_N)$ of new parameters are generated. Further, a simulation forecasted value is obtained using each parameter. As a result, a particle using a parameter having a high relative likelihood is calculated.

Step S4: Time integration using dynamic simulation is performed on the resampled particles. As a result, the simulation forecasted value at the time of acquiring the next observation data is obtained for each element length L. The dynamic simulation is performed using, for example, the model used in step S1. The process then returns to step S2.

After steps S2 to S4 are repeated a predetermined number of times, a weighted average of the plurality of particles is taken for each length L of the element. Here, the number of repeats of steps S2 to S4 may be a certain number, but the setup may be such that a weighted average of a plurality of particles is taken on the occasion of the relative likelihood being below a certain value. In addition, as the number of particles whose the weighted average is taken, any number having a high relative likelihood can be adopted.

As described hereinabove, in the present embodiment, because the observation data by the optical fiber sensor 13 is sequentially fetched in step S2, the information processor 11 is capable of performing highly accurate behavior estimation. Furthermore, in the present embodiment, because the strain of the entire vertically long linear structure 20, having a large amount of information, is measured, and the likelihood, taking into account the entire linear structure 20, is calculated using Formula (4), it is possible to attain the advantageous effect of enabling an enhanced forecast accuracy for the linear structure 20.

In the present embodiment, an example in which the uncertain parameter is the deflection angle θ is illustrated, but the uncertain parameter may be any parameter used in a simulator that forecasts the behavior of the linear structure 20 in water. For example, the parameters used in the simulator for estimating behavior of the linear structure 20 in water include the tension T of the linear structure 20, the velocity of the ship 100, the elasticity E of the linear structure 20, the cross-sectional area A of the linear structure 20, the velocity V with respect to the fluid around the linear structure 20, the mass m per unit length of the linear structure 20, the fluid density $\rho_w$ around the linear structure 20, the resistance coefficient $C_t$ in the tangential direction of the linear structure 20, the resistance coefficient Cn in the normal direction with respect to the linear structure 20, the additional mass coefficient Cmf in the fluid acceleration motion, the additional mass coefficient Cmb in the element acceleration motion, the diameter d of the linear structure 20, and the like.

Note that, in a case where there are two or more uncertain parameters, a particle is generated for each combination of uncertain parameters in step S1, and discrete values of a parameter range are densified for a combination of parameters having a high likelihood in step S3. Accordingly, the present disclosure affords the advantageous effect of enabling an enhanced forecast accuracy for the linear structure 20 by using a combination of high likelihood parameters, even in a case where there are two or more uncertain parameters.

Second Embodiment

The present embodiment relates to a simulation result of behavior estimation to which the sequential data assimilation method described in the first embodiment is applied.

The advantageous effect of the behavior estimation was verified using a model in which a linear structure 20 made of elastic rubber (Young's modulus: $5.0 \times 10^5$ Pa), having a length of 40 m, a diameter of 0.5 m, and a density of 1000 kg/m$^3$, is hung straight in still water, and the upper end of the linear structure was subjected to single vibration in the horizontal direction with an amplitude of 2 m and a period of about 1.5 s for 10 seconds.

For the simulation, the time division was 0.001 second, the length L per element was 1 m, the fluid density was 997 kg/m$^3$, and the coefficients of the tangential resistance coefficient Ct, the normal resistance coefficient Cn, and the additional mass coefficient Cmb were 1.5, 0.03, and 1, respectively. The observation data was the deflection angle θ with respect to each length of 1 m obtained from the strain distribution of the linear structure, and the sampling rate was 25 Hz.

The number of weighted averages taken in the merging particle filter was 3, and the weighting factor was set as

[Formula 6]

$$\alpha_1 = 19/20$$

$$\alpha_2 = (1+\sqrt{77})/40$$

$$\alpha_3 = (1-\sqrt{77})/40 \quad (6)$$

Here, $\alpha_1$ is a weight of a particle having the highest relative likelihood, $\alpha_2$ is a weight of a particle having the second highest relative likelihood, and $\alpha_3$ is a weight of a particle having the third highest relative likelihood.

The start of the sequential data assimilation was after 2 seconds from the start of the simulation, and the unknown parameters to be estimated were mode attenuation ratios. It is assumed that the attenuation ratios of the primary mode and the secondary mode are equal.

Figure 6:
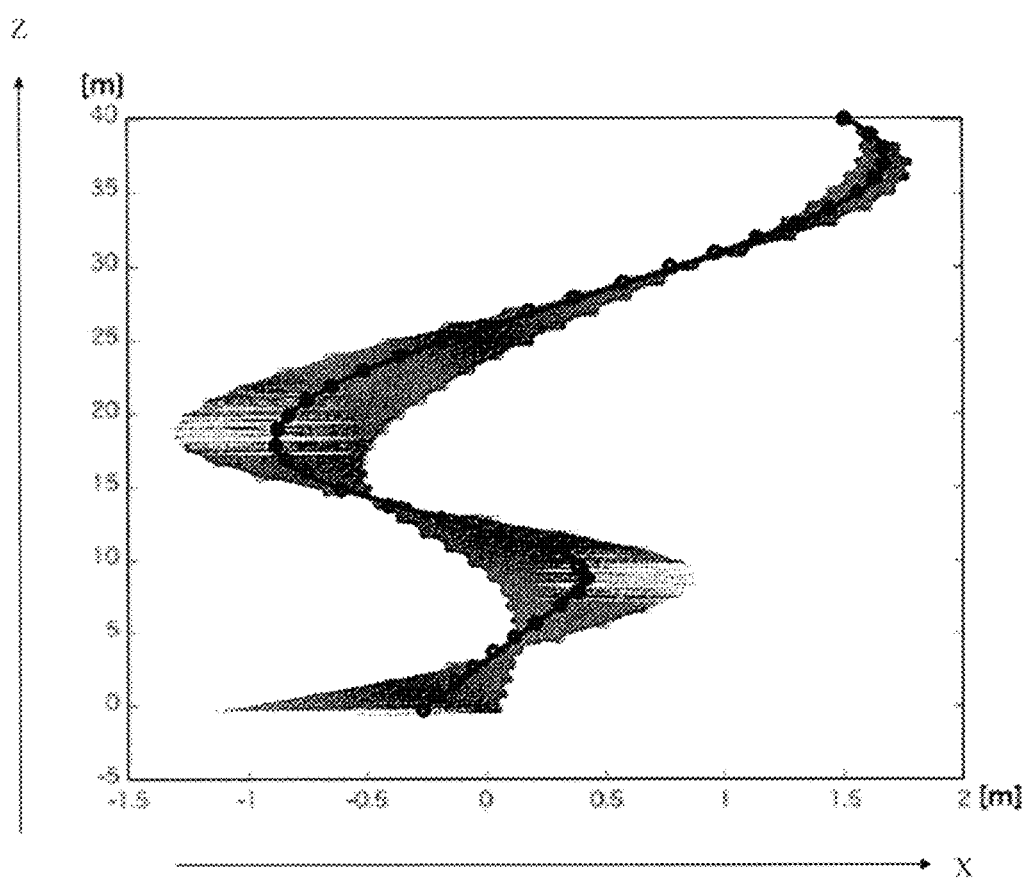
FIG. 6 illustrates a behavior estimation result of a linear structure in a case where the present disclosure is not used.

FIG. 6 illustrates that the simulation was performed, with the sequential data assimilation unperformed and the mode attenuation ratio retaining the uncertainty of the prior distribution, and a shape estimation result of the linear structure was obtained ten seconds after. The vertical axis represents the distance in the depth direction, and the horizontal axis represents the distance in the horizontal direction. The coordinates (0, 0) indicate the position of the linear structure 20 fixed to the ship 100 illustrated in FIG. 1. In light of FIG. 6, it can be seen that a particularly large uncertain element (estimation error) exists in the region of maximum amplitude in the horizontal direction.

Figure 7:
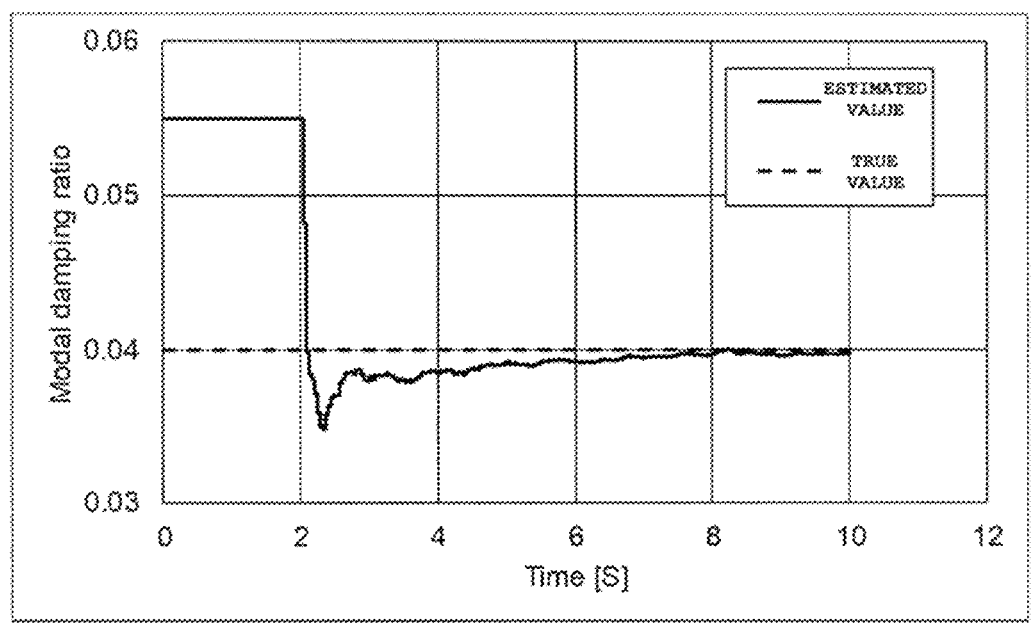
FIG. 7 illustrates a behavior estimation result of a linear structure in a case where the present disclosure is used.

FIG. 7 illustrates a temporal change in an estimation error where sequential data assimilation was applied. It can be seen that together with the application of sequential data assimilation (after two seconds), the estimation error is significantly reduced and converges to an approximately true value after 8 seconds of application.

OTHER EMBODIMENTS

Figure 8:
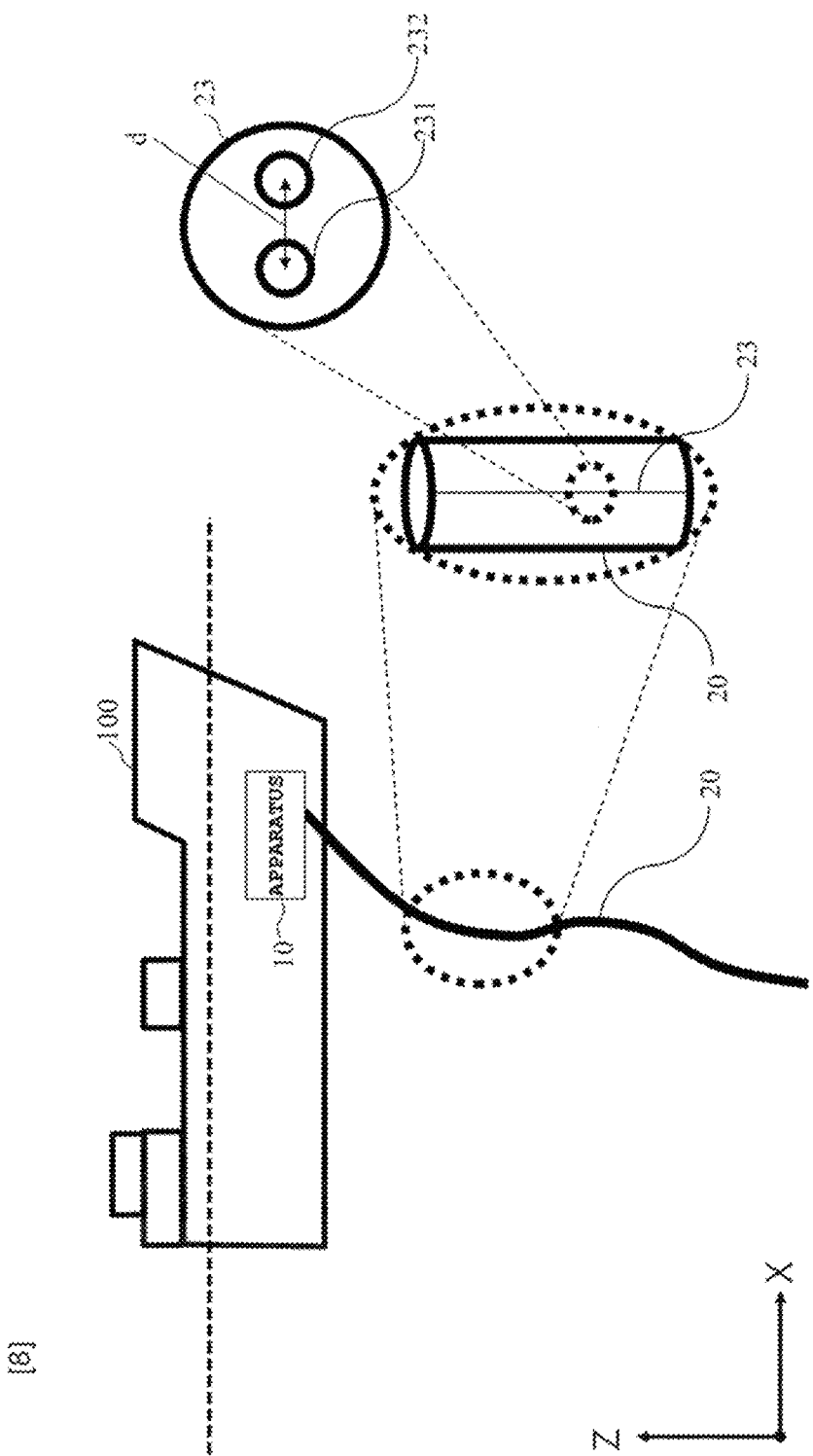
FIG. 8 illustrates an example of a system configuration of the present disclosure.

Note that although, in the above-described embodiment, a state where the cores of the two optical fibers 21 and 22 have the interval d therebetween, was described as an example, instead of the optical fibers 21 and 22, one multicore optical fiber 23 in which a plurality of cores 231 and 232 are arranged to have the interval d in the cladding of the optical fiber, as illustrated in FIG. 8, may be used. Moreover, although FIG. 8 illustrates, as an example, the multicore optical fiber 23 which has two cores, the number of cores may be two or more, and the arrangement of the cores may take any form. For example, a four-core fiber having one core at the center and three cores on the outer periphery thereof may be used.

Advantageous Effects of the Present Disclosure

Because, according to the present disclosure, observation data is sequentially fetched using a distribution-type sensor, highly accurate real-time behavior estimation can be performed. Furthermore, according to the present disclosure, when estimating behavior of a vertically long linear structure having a large amount of information, by measuring the entire strain, the accuracy of the behavior estimation can be enhanced in comparison with a case where the position coordinates of one intermediate point are measured using single point measurement.

INDUSTRIAL APPLICABILITY

The present disclosure can be applied to the information communication industry.

REFERENCE SIGNS LIST

10 Apparatus
11 Information processor
12 Storage unit
13 Optical fiber sensor
14 Input unit
20 Linear structure
21, 22 Optical fiber
23 Multicore optical fiber
231, 232 Core
100 Ship

The invention claimed is:

1. An apparatus comprising:
an optical fiber sensor in which an optical fiber is arranged along a linear structure and configured to detect strain of the optical fiber; and
a processor configured to:
express at least one parameter in a plurality of discrete values for each predetermined length of the linear structure, and forecast behavior of the linear structure by using each of the discrete values;
acquire behavior of the linear structure detected using the optical fiber;
calculate a likelihood between the forecasted behavior of the linear structure and the acquired behavior of the linear structure;
update at least one of the plurality of discrete values on the basis of the likelihood; and
calculate behavior of the linear structure by using the updated plurality of discrete values,
wherein the likelihood is calculated based on an infinite product of a probability density function defined by an average value of a displacement in a rotation direction of the linear structure derived for each predetermined length, and a standard deviation of an observation error of the behavior of the linear structure detected by using the optical fiber, wherein the behavior of the linear structure is acquired by calculating a deflection angle with respect to each unit length of the linear structure, on the basis of the strain detected by the optical fiber sensor.

2. The apparatus according to claim 1, wherein the optical fiber sensor detects the strain of a plurality of optical fibers arranged along the linear structure, and calculates the deflection angle with respect to each unit length of the linear structure, on the basis of a difference in the strain per unit length of the plurality of optical fibers.

3. The apparatus according to claim 1, wherein the optical fiber sensor detects the strain of a plurality of cores included in a multi-core optical fiber arranged along the linear structure, and calculates the deflection angle with respect to each unit length of the linear structure, on the basis of a difference in the strain per unit length of the plurality of cores.

4. The apparatus according to claim 1, wherein the forecasted behavior of the linear structure is displacement in a rotation direction with respect to each unit length of the linear structure, and wherein the likelihood is calculated, on the basis of the forecasted displacement in the rotation direction with respect to each unit length of the linear structure and the calculated deflection angle with respect to each unit length of the linear structure.

5. The apparatus according to claim 1, wherein behaviors of the linear structure are forecasted by using the updated plurality of discrete values, wherein weighting according to the likelihood is applied to the forecasted behaviors of the linear structure, and wherein the behavior of the linear structure is calculated by taking an average of the weighted behaviors of the linear structure.

6. A method, comprising:

providing an optical fiber sensor in which an optical fiber is arranged along a linear structure and configured to detect strain of the optical fiber;

expressing at least one parameter in a plurality of discrete values for each predetermined length of the linear structure, and forecasting behavior of the linear structure by using each of the discrete values;

acquiring behavior of the linear structure detected using the optical fiber;

calculating a likelihood between the forecasted behavior of the linear structure and the acquired behavior of the linear structure;

updating at least one of the plurality of discrete values on the basis of the likelihood; and calculating behavior of the linear structure by using the updated plurality of discrete values, wherein the likelihood is calculated based on an infinite product of a probability density function defined by an average value of a displacement in a rotation direction of the linear structure derived for each predetermined length, and a standard deviation of an observation error of the behavior of the linear structure detected by using the optical fiber, wherein the behavior of the linear structure is acquired by calculating a deflection angle with respect to each unit length of the linear structure, on the basis of the strain detected by the optical fiber sensor.

* * * * *